United States Patent [19]

Maravic

[11] Patent Number: 5,365,974
[45] Date of Patent: Nov. 22, 1994

[54] FLOW-CONTROL VALVE

[76] Inventor: Dusko Maravic, Kirchweg 27c, CH-5415 Nussbaumen, Switzerland

[21] Appl. No.: 962,240
[22] PCT Filed: May 12, 1992
[86] PCT No.: PCT/CH92/00092
  § 371 Date: Jan. 27, 1993
  § 102(e) Date: Jan. 27, 1993
[87] PCT Pub. No.: WO92/21903
  PCT Pub. Date: Dec. 10, 1992

[30] Foreign Application Priority Data

May 28, 1991 [CH] Switzerland ............ 1573/91-0

[51] Int. Cl.$^5$ .................................... F16K 17/30
[52] U.S. Cl. .......................... 137/493; 137/512.2
[58] Field of Search ............ 137/498, 512.2, 512.3

[56] References Cited
FOREIGN PATENT DOCUMENTS 855186 11/1952 Germany .
676384 1/1991 Switzerland .
9215810 9/1992 WIPO .

Primary Examiner—Robert G. Nilson
Attorney, Agent, or Firm—Speckman, Pauley & Fejer

[57] ABSTRACT

A flow control valve having a housing in which an insert is positioned. Fluid flows around all sides of the insert. A guide cylinder is positioned within the housing on an inlet side of the housing. A shaft of a first spring-loaded control element is guided and axially displaceable in the guide cylinder. The first control element has a valve disk with a collar. The valve disk has at least one lateral bore. The collar is enclosed by a second control element which is formed as a spring-loaded control sleeve. The second control element is guided and axially displaceable in the housing. In a zero flow-through operating condition, a rim of the valve disk rests against a bottom of the second control element thereby blocking each lateral bore in the collar of the first control element.

8 Claims, 8 Drawing Sheets $Q = 0$ $Q = Q_N$

Q=0

$Q = Q_N$ $Q > Q_N$

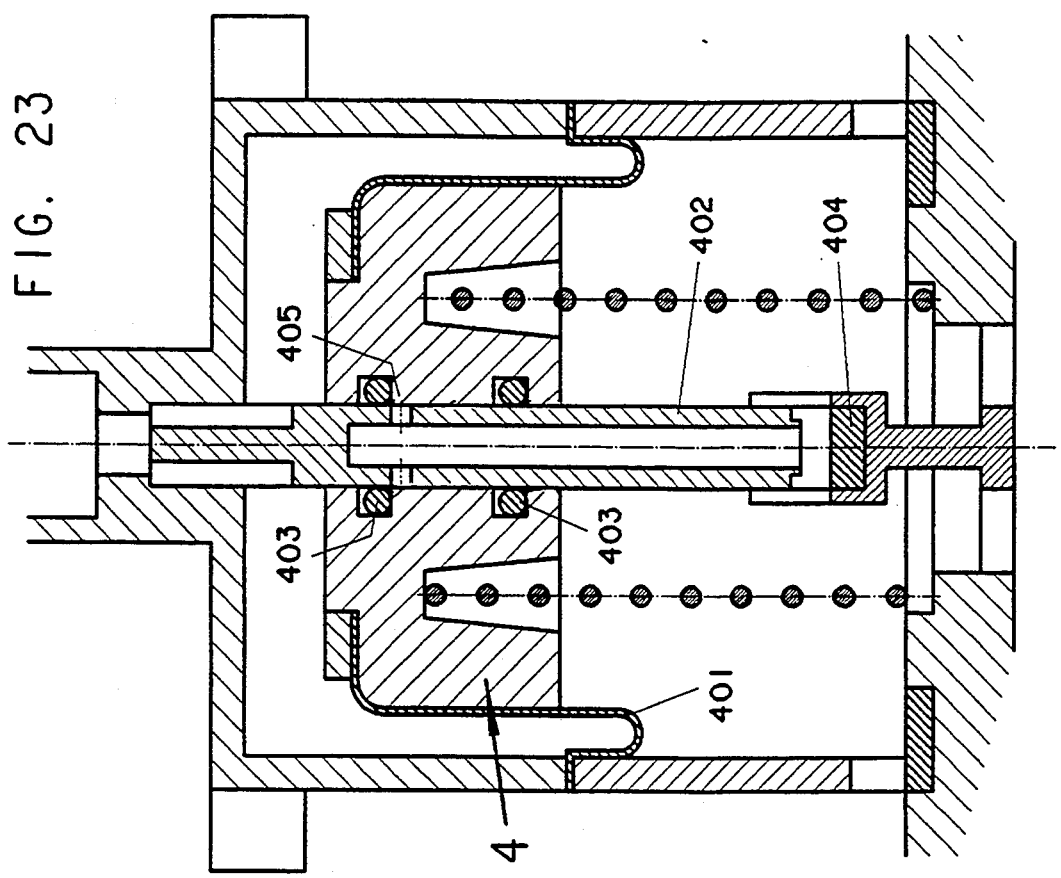
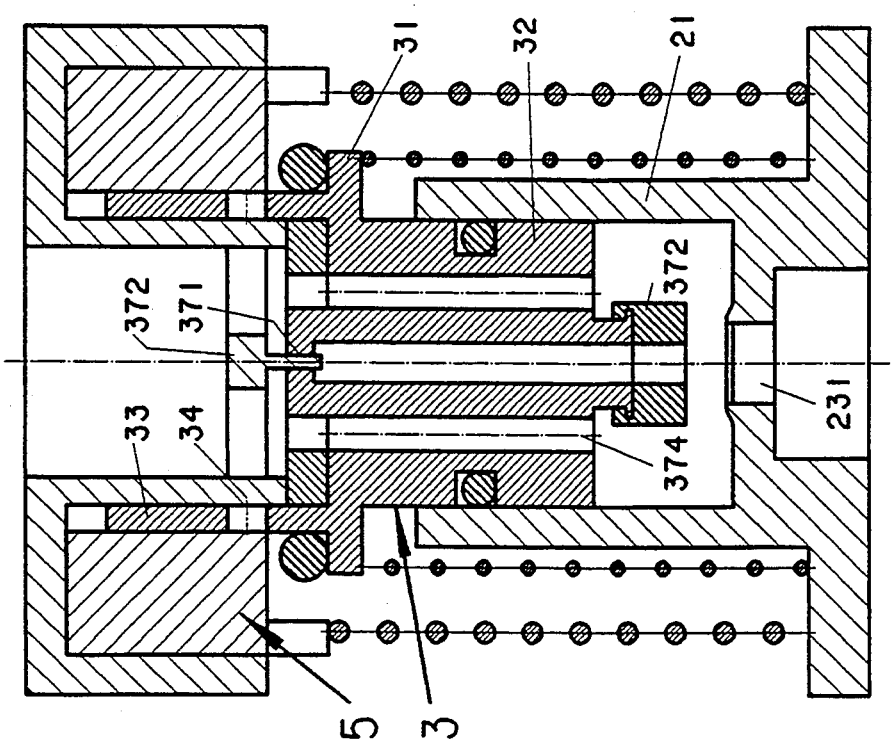

FLOW-CONTROL VALVE

BACKGROUND OF THE INVENTION

1. Field of the Invention

This invention relates to a flow control valve.

2. Description Prior Art

Such valves are generally known. They are installed in a pipeline and their purpose is to control the flow through this pipe or, to state it more precisely, to monitor it. This monitoring function can be a result of the valve not letting more fluid flow through than has been pre-determined, even if pressure on the supply side increases. Therefore its function is more extensive than that of a simple throttle valve. A flow control valve can also block flow-through, if too much fluid flows through. A flow control valve can also block small amounts of flow-through, such as occurs in case of leaks.

With excessive flow-through, such as occurs in the case of a bursting pipe or when a hose bursts, the flow control valve should close as rapidly as possible, while the interruption of the flow-through does not necessarily have to be performed rapidly.

In certain cases, for example with washing machines, is admitted during defined cycles over a defined length of time. This water admittance time is controlled by electromagnetic valves.

If such a valve becomes stuck, the result can be flooding In this instance it is advantageous to install a flow control valve in the supply pipe, which blocks the flow after the defined flow-through time has been exceeded. To manage all the above mentioned control functions, conventional flow control valves by themselves or in combination with other valves can perform these functions. If a plurality of valves are required for performing the desired control functions, the installation becomes rather expensive. This is the case when, in addition to the valve operated by the pressure of the flowing fluid, a valve which is operated by external energy, for example an electric valve, is required. Most flow control valves known today vary in construction, depending on whether they are intended to perform one or the other control function. In most cases the known flow control valves are designed in such a way that they can only perform one or at most two of the desired control functions. This makes the production of such flow control valves more expensive and also hampers their universal application, which would be advantageous in the interest of safety.

From Swiss Patent Application No. 00598/91-0 a flow control valve with a housing is known, in which a fixed insert is installed, around all sides of which liquid can flow, such valve comprises a guide cylinder with a spring-loaded control element on the inlet side and a main cylinder on the outlet side which adjoins the guide cylinder and has a guided spring-loaded closing piston. During zero flow-through the control element has a disk valve which closes off the inlet opening, with a shaft guided in the guide cylinder, wherein the shaft and the disk have central through-bores. A centrally located sealing element is maintained in the bottom of the guide cylinder, next to which at least one through-opening from the guide cylinder to the main cylinder remains free. Depending on the closing characteristic the flow control valve has, the sealing element disposed in the guide cylinder must be fixedly or elastically maintained. It has been shown that unwanted oscillations can occur with an elastically spring-mounted fastening. Thus it is almost impossible to define the reaction threshold clearly. Also in case of a burst pipe or any other sudden pressure drop on the outlet side the valve closes comparatively slowly because closing is performed by the closing piston.

SUMMARY OF THE INVENTION

It is the object of one invention to provide a flow control valve which avoids the disadvantages associated with conventional valves and which has at least the following closing characteristics.

The valve closes when the normal flow-through $Q_N$, for which it has been designed, is exceeded.

The valve closes almost instantly if the counter pressure on the outlet side disappears, for example in case of a burst pipe.

This object is attained by the invention with a flow control valve having features.

The valve of this invention also closes after a defined period of time in case of leakage, it closes after a defined period of time during normal flow-through $Q_N$, and it becomes effective as a check valve.

The closing characteristic during normal flow through $Q_N$ is of particular advantage if the flow control valve is connected upstream of a washing machine with electro-magnetically controlled valves, for example, and the water inlet valve becomes stuck in the open position. In this case the flow control valve prevents flooding.

Preferred embodiments of the this invention are shown in the attached drawings, wherein FIGS. 1 to 3 show one preferred embodiment of a flow control valve in an axial cross section during different operational states, namely in FIG. 1 during zero flow-through (Q=0);

FIG. 2 during flow-through in accordance with normal operation, and

FIG. 3 where the flow-through amount has exceeded the flow-through amount provided for normal operation $(Q>Q_N)$.

FIG. 4 shows a section of the valve in a closed state during normal flow-through (Q=0).

FIG. 5 shows the valve during normal flow-through $(Q=Q_N)$, and

FIG. 6 shows the valve in a condition where it has blocked flow-through because the defined flow-through amount was exceeded $(Q>Q_N)$.

FIGS. 7 to 9 show another variant of a valve in accordance with FIGS. 4 to 6, wherein FIG. 7 is a cross section of the valve, where there is a leak on the outlet side, FIG. 8 is the same valve as that in FIG. 7 but only during normal flow-through, $(Q=Q_N)$.

FIG. 9 shows the valve during an excessive pressure drop at the outlet side, for example in case of a burst pipe.

FIGS. 12 to 23 show other preferred embodiments of a flow control valve, wherein FIG. 12 shows the valve in the rest position at zero flow-through (Q=0);

FIGS. 13 and 14 show the same valve with a leak at the outlet side;

FIGS. 15 to 18 show the same valve in a rearward position and with normal flow-through (Q=$Q_N$), which is blocked after a defined period of time;

FIGS. 19 to 21 show the same valve where the permissible flow-through amount is being exceeded (Q<$Q_N$);

FIGS. 22 and 23 details of the same valve on an enlarged scale.

DESCRIPTION OF PREFERRED EMBODIMENTS

Figure 1:
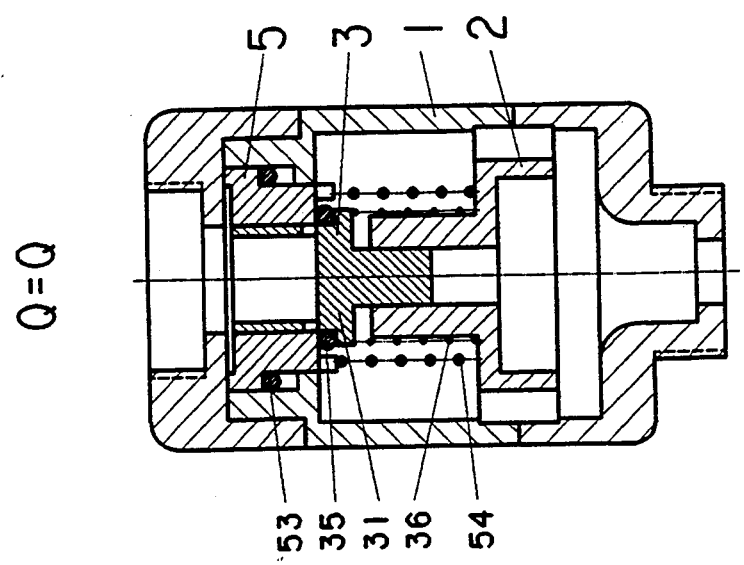

FIG. 1 shows a simple structural form of a flow control valve comprising a two-part housing 1, in which an insert 2, around all sides of which fluid can flow, is held by means of ribs 23.

The insert 2 contains a guide cylinder 21 in which the shaft 32 of a first control element 3 is slidingly guided. The first control element 3 is in the shape of a disk valve with a shaft 32 and a disk 31 with an upward extending collar 33 in which one or a plurality of bores 34 are disposed. A spring 36 supported on the insert 2 tends to push the first control element 3 upward until in the rest position during zero flow-through it lies at the bottom against the second control element 5. An O-ring 35 takes care of sealing.

The second control element 5 has the shape of a sleeve, which is seated gliding axially on the inlet side in the upper part of the housing and is pressed upward by a second spring 54 supported on the insert 2. The sleeve 5 has a protruding rim, under which an O-ring 53 is inserted.

Figure 2:
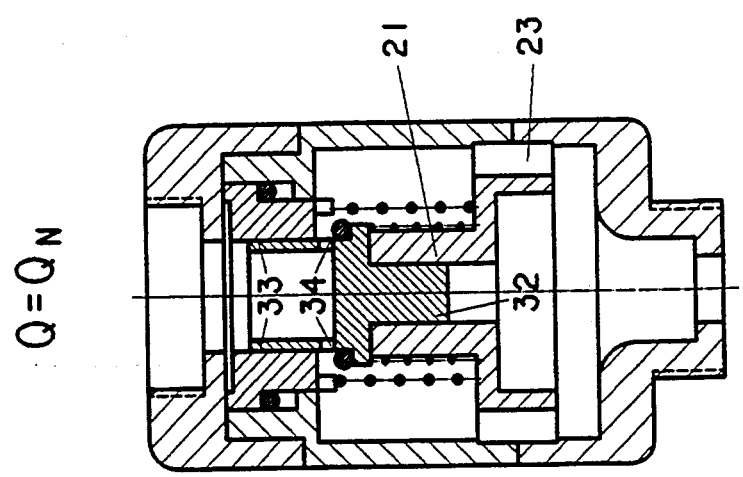

In FIG. 1 the valve is shown in the state of rest, i.e. during zero flow-through (Q=0). In this case the pressure is the same in the top of the housing 1 or in the supply pipe, not shown, as in the lower part of the housing 1. FIG. 2 shows the valve during normal flow-through (Q=$Q_N$), where the first control element 3 has moved against the spring force from below until it rests on the upper rim of the guide cylinder 21. In such position, the bores 34 are unblocked. This movement has taken place because of the relatively small pressure difference between pressure in the supply pipe and pressure in the housing 1.

Figure 3:
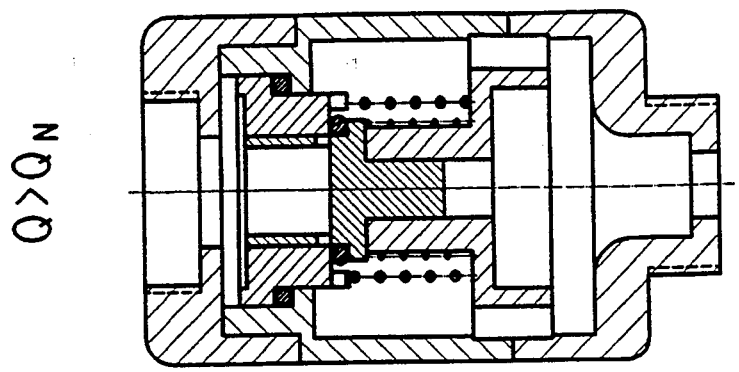

FIG. 3 shows the valve in the case where the flow-through amount exceeds the defined amount for which the valve is constructed (Q>$Q_N$).

Because of this, the pressure difference between pressure in the supply pipe and in the interior of the valve becomes sufficiently great so that the second control element 5 is pushed down against the force of the spring 54, blocks the bore 34 and makes further flow-through impossible. In this case the O-rings 35 and 53 provide a good seal.

Thus, this valve has the property of closing almost immediately in case the normal flow-through is exceeded or in case of a burst pipe on the outlet side. The advantage of this arrangement is that the second control element 5 is loaded by its own spring 54 which is independent of the closing spring 36 of the first control element 3.

In this way it is possible to define the reaction threshold clearly when normal flow-through has been exceeded.

As a particular property of this valve it should also be mentioned that it can easily become effective as a check valve. If absolute tightness is required in this case, a seal ring can be placed on top of the second control element 5.

Figure 4:
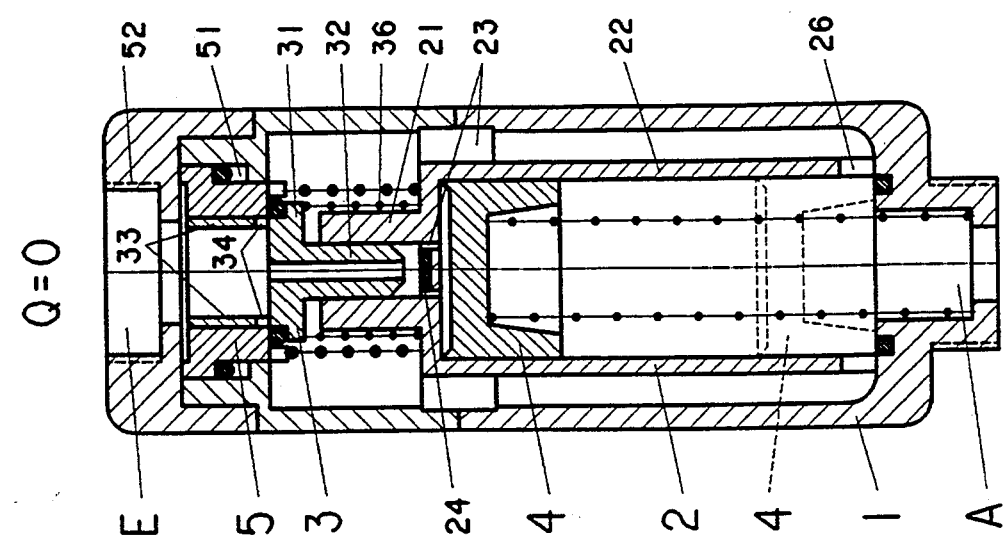

Two preferred embodiments of a valve are described below, wherein the insert, around all sides of which fluid flows, is supplemented by a closing piston. In FIGS. 4 to 9 the same reference numerals as in FIGS. 1 to 3 have been used for the same or equivalent parts. FIG. 4 shows a larger two-part housing 1, in which an insert, designated by 2 as a whole, around all sides of which fluid can flow, is mounted. The insert comprises an upper part, which is embodied as a guide cylinder 21, which is adjoined at the bottom by a main cylinder 22 of larger diameter. The insert as a whole is held by means of protruding ribs 23 in the housing 1. A sealing element 24 is disposed in the bottom of the guide cylinder 21.

Next to the sealing element made of plastic or rubber are bores 25 which form communication between the guide cylinder 21 and the main cylinder. A control element, designated by 3 as a whole, is slidingly guided in the guide cylinder 21. The control element 3 has the shape of a disk valve with a valve disk 31, a shaft 32 with a central bore 32' and a collar 33 connected with the disk 31. Lateral bores 34 are within the collar 33, which act as a throttle determining the pressure drop in the flow control valve and thus the reaction threshold. An O-ring 35 is disposed on the rim of the valve disk 31 for improved sealing.

A pressure spring 36 extending between the upper part of the main cylinder 22 and the underside of the valve disk 31 presses the control element 3 upward into the closing position.

A piston 4, pushed upwards by a pressure spring 41 supported in the bottom of the housing 1, is located in the main cylinder 22 of the insert. Passages 26 are disposed in the bottom of the main cylinder, through which water or another fluid reaches the outlet opening A during normal operation.

An O-ring 42 is disposed in the bottom of the housing 1, on which the lower rim of the piston 4 rests when it is in the lowermost position as indicated by broken lines in FIG. 4.

A spring-loaded control sleeve 5 is seated in an axially sliding manner in the upper inlet area E of the housing 1. The interior diameter of the sleeve 5 is of such size that the collar 33 of the control element 3 is slidingly guided in it.

The exterior diameter of the sleeve 5 is stepped, so that the annular surface at the inlet side is larger than the side oriented towards the interior. The control sleeve 5 is seated in a bore 51 in the upper part of the housing 1 and is held on the inlet side by a screw ring 52. An O-ring 53 is disposed under the exterior steep of the control sleeve 5. A second spring 54 disposed concentrically with the spring 36 tends to push the control sleeve 5 upward and to keep it in the position in accordance with FIG. 1.

Figure 9:
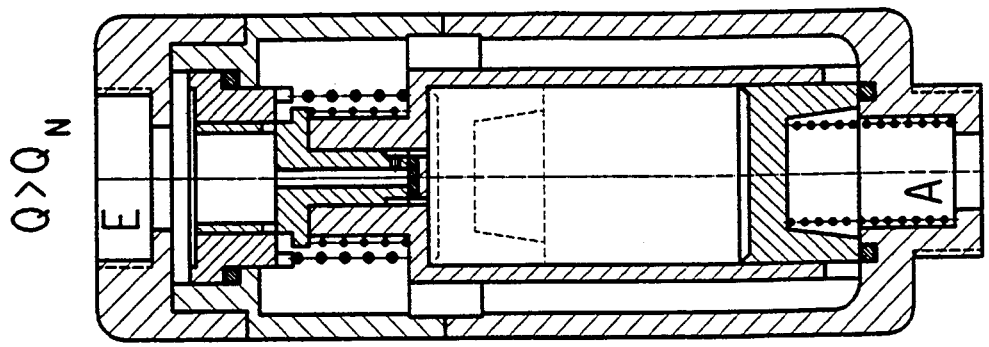
Figure 8:
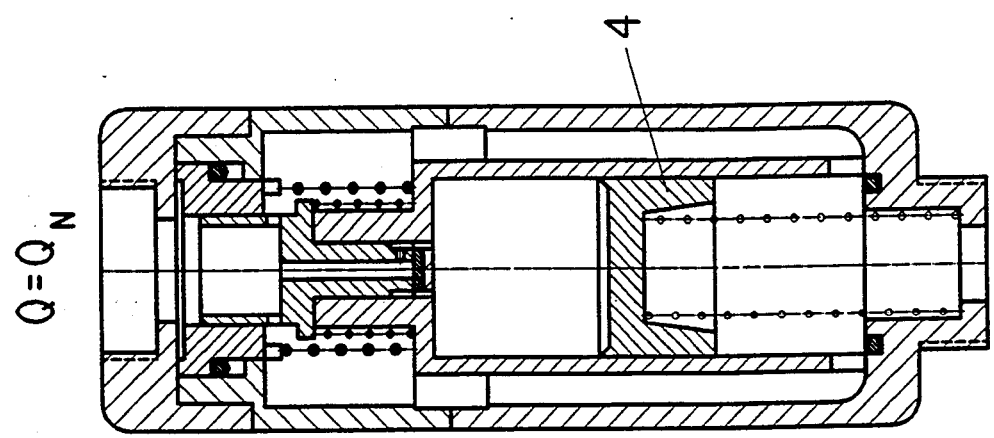
Figure 7:
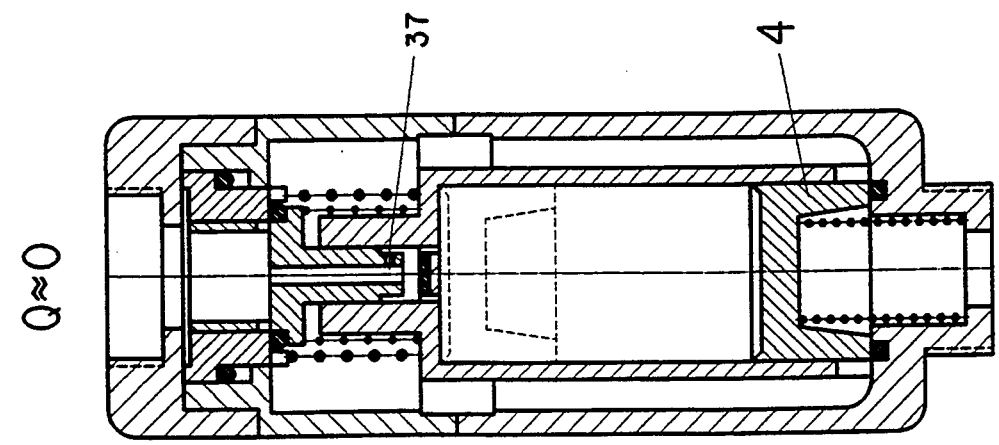
Figure 10:
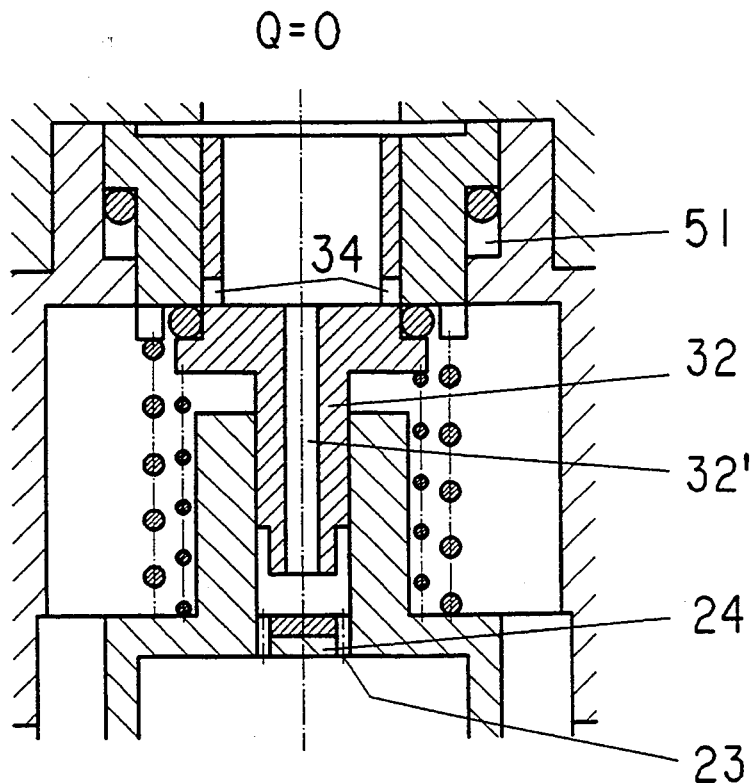
FIG. 10 is an enlarged partial cross section of a valve in accordance with FIG. 4.
Figure 11:
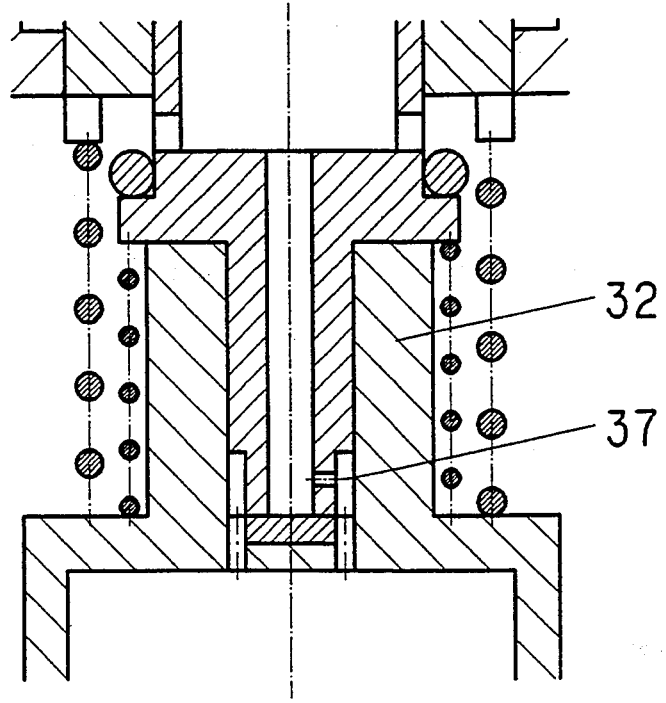
FIG. 11 is an enlarged partial cross section of a valve in accordance with FIG. 8.

The flow control valve illustrated in FIGS. 7 to 9 differs from the above described embodiments of the valve of this invention only in that the shaft 32 of the control element 5 tapers at the lower end and is provided with a capillary bore 37 as shown in FIG. 11).

Now that the structure of the various embodiments of the flow control valve has been described, the mode of operation of the simplest valve in accordance with FIGS. 1 to 3 will first be described. FIG. 1 shows the valve in the closed state at zero flow-through (Q=0). FIG. 2 shows the valve during normal flow-through and FIG. 3 in the case that excessive withdrawal takes place at the outlet side for example because too many spigots have been opened or a pipe has burst. The pressure difference between pressure in the supply pipe and the pressure in the interior of the valve has become so great because of this that the second control element 5 reacts and closes the valve. This state is maintained until the leak has been fixed or the excessive withdrawal is reduced for example by closing some spigots. The valve then automatically returns into the position in accordance with FIG. 2.

As can be seen from FIG. 1, the valve additionally has the property of a check valve. The valve does not react to a small leak.

Figure 6:
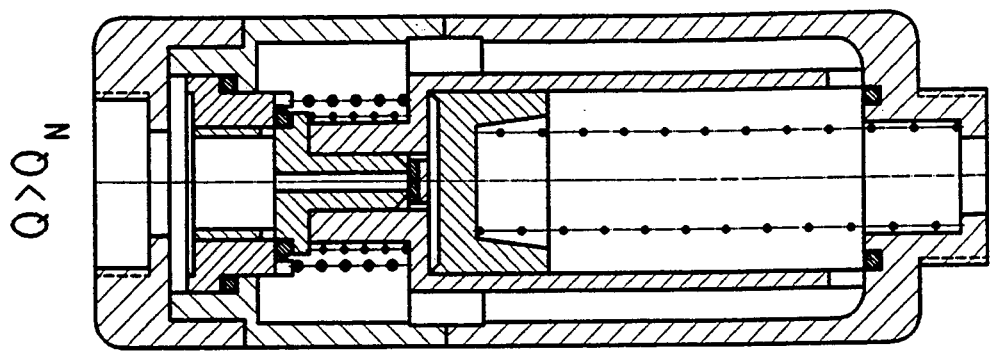
FIGS. 4 to 6 show a preferred embodiment of a flow control valve which has been supplemented by a cylinder with a closing piston in cross sectional view.
Figure 5:
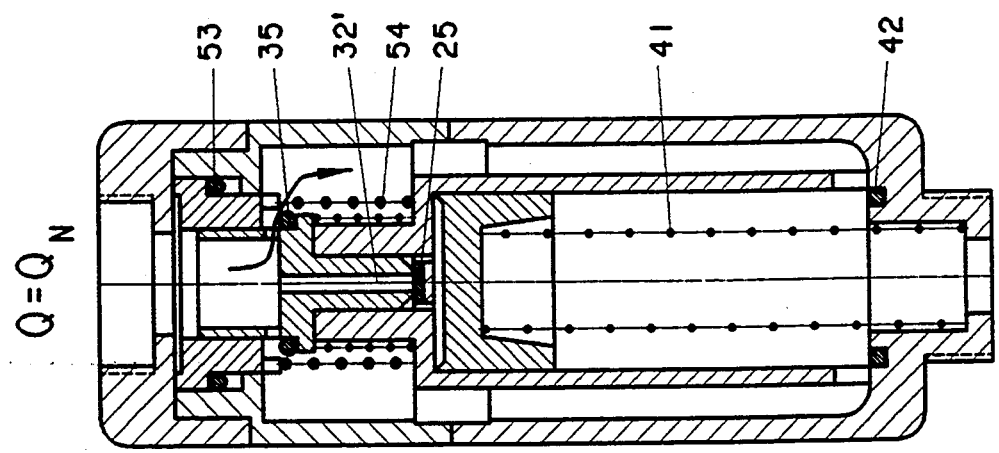

The changed structure of the valve in accordance with FIGS. 4 to 6 lends a different characteristic to the valve, in that it also closes in case of a leak.

FIG. 4 shows the operational position of the valve during zero flow (Q=0). In case there is a leak at the outlet side, for example because of a spigot connected to the outlet pipe, not shown, which does not close completely, the flow control valve begins to function. The amount of flow-through in this case is assumed to be so small that all parts remain in the rest position shown, with the exception of the piston 4.

The amount of water or other fluid appearing in case of a leak is replaced by the amount displaced by the closing piston 4, for which water flows through the central bore 32'. Because of this, the piston 4 is moved downward against the force of the spring 41 until the lower rim of the piston rests on the O-ring 42 and reaches the position shown by broken lines in FIG. 4, so that the flow is no longer possible.

FIG. 5 shows the flow control valve during normal flow-through. The bores 34 in the collar 33 of the control element are of such a size that during normal flow-through ($Q=Q_N$) they generate a pressure difference between the supply pipe $P_1$, not shown, and a lower pressure $P_2$ in the interior of the valve.

This pressure difference $P_1-P_2$ is sufficient to compress the inner spring 36 to such a degree that the underside of the valve disk on the upper rim of the guide cylinder 24 blocks the central bore 32 of the control element 3. Therefore the water fluid flows through the bores 34, around the exterior of the insert 2, through the openings 26 in the lower end of the main cylinder 22 to the outlet opening A.

FIG. 6 shows the flow control valve in a position where the flow-through exceeds the normal value $Q_N$ ($Q>Q_N$). This has the result of the pressure difference $P_1-P_2$ becoming greater. Because the upper surface of the control sleeve 5 which is acted upon by the pressure $P_1$ is larger than the lower surface of the control control sleeve acted upon by the pressure $P_2$, it is displaced downward, in the course of which it closes the bores 34 and blocks further flow-through, the O-rings 53 and 35 taking care of sealing. The exterior second pressure spring 54 is compressed in the course of this action.

Thus, selection of the force of this spring makes it possible to set the reaction threshold where the valve blocks flow-through. It should finally be noted that in this case the control sleeve 5 blocks flow-through, not the closing piston 4.

The flow control valve in accordance with FIGS. 7 to 9 differs in its structure from the valve in accordance with FIGS. 4 to 6 only in that the shaft 32 of the control element 3 tapers downward and has a lateral capillary bore 37. Thus the valve can assume a further control function as described below.

FIG. 7 shows the valve in a position during zero flow-through, but with an existing leak, so that the piston 4 has moved downward and has blocked the outlet opening. In this case the capillary bore 37 has no function. However, this is different with those in FIGS. 8 and 9.

FIG. 8 shows the flow control valve during normal flow-through conditions ($Q=Q_N$). The flow-through conditions correspond to those explained in view of FIG. 5 but with the difference that in spite of the blocked central bore 32' water fluid now flows through the capillary bore 37 into the main cylinder 22 and acts on the piston 4 as shown in FIG. 11).

In FIG. 8 the piston 4 is shown having travelled half of its distance. How long the piston 4 will take until it arrives at the bottom and blocks further flow-through depends on the size of the capillary bore. With this, a means is available to limit the flow-through over time. The purpose of such a temporal flow-through limitation has already been discussed in the preamble.

FIG. 9 shows the flow control valve in an operational state where the normal flow-through for which the valve has been designed, has been exceeded. The mode of operation of the valve corresponds to the mode of operation described by FIG. 6 with the difference that now water fluid continues to flow through the capillary bore into the main cylinder, acts on the piston 4 so that it blocks the outlet opening A after a defined period of time. Thus the pressure inside the valve increases to the pressure $P_1$ at the inlet side.

Thus, there is no longer a pressure difference in the interior of the valve and this means that the control element 3 and the control element 5 return into the "rest position" as shown in FIG. 3.

Because of their construction, the flow control valves of this invention are also effective as check valves. If absolute tightness is required in this case, it is recommended to dispose a seal ring on the top of the second control element 5. The O-ring 53 provides a seal against the housing only during a downward movement of the control element 5 and is seated with play in the bore 51 so that it does not slow the movement of the control element 5 because of friction.

FIGS. 12 to 22 show a further embodiment of a flow control valve according to this invention in various operational positions.

Figure 12:
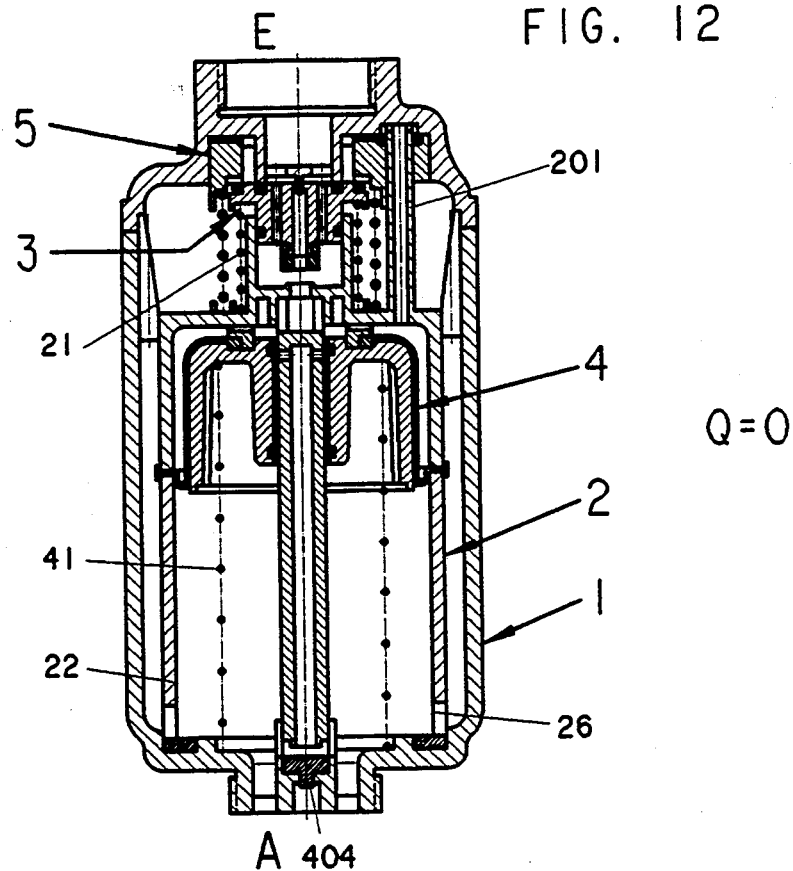
Figure 13:
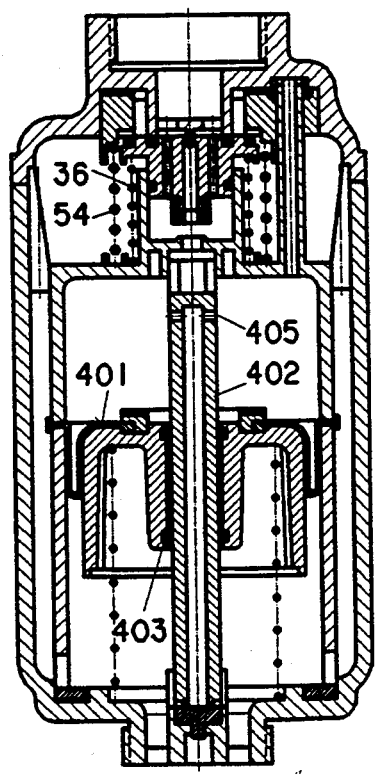

The general structure of the valves is described by means of FIGS. 12 and 13 and the detailed FIGS. 22 and 23 and differs only by some details from the valve in accordance with FIGS. 4 to 9. Therefore similar or equivalent parts are indicated with the same reference numerals.

An insert 2, around all sides of which fluid can flow, with an upper part in the shape of a guide cylinder 21, in which on a shaft 32 of the first control element 3 is guided, is located in the housing 1. The control element has a disk 31 with a collar 38, which is provided with passages 30. The wall 22 of the insert forms a cylinder in which a piston 4 is guided.

A second control element 5 in the shape of a sleeve is slidingly guided in a bore of the housing 1 in the upper part of the valve near the inlet opening. Both control elements 3 and 5 and the piston 4 are loaded by springs 36, 54, 41.

The parts of such preferred embodiments which differ from the parts described by FIGS. 4 to 9 are indicated by three-digit reference numerals. These are a capillary bore 371, which is no longer disposed in the bottom on the shaft of the first control element 3, but at the top in the disk 31 as shown in FIG. 22. This has the advantage that in the rest position of the control element during zero flow-through, in the area of the inlet E a fixedly disposed pin 372 extends through the bore. This prevents the capillary bore from becoming clogged, which would impair the operation of the valve.

The capillary bore 371 terminates in a further, centrally disposed bore. The latter is provided with a resilient seal ring 372 on the bottom. Through-bores 374 are disposed next to the central bore.

According to a further structural change, the piston 4 is sealed against the cylinder wall 22 by an unwinding diaphragm 401. A guide tube 402, which extends through the piston 4 and is sealed by O-rings 403, takes over the centered guidance of the piston 4. The guide tube 402 is guided at the top and the bottom in the insert 2 or in the housing 1, but has a small amount of axial play. During the upward movement of the piston 4, the friction of the O-rings causes the guide tube 402 to be moved along and its lower end to be sealingly seated on the tang 404 as shown in FIG. 13. A bore 405 is cut in the upper area of the guide tube 402 and its purpose will be explained later.

Finally, a tube 201 leads from the insert part 2 through the annular second control element 5.

Figure 14:
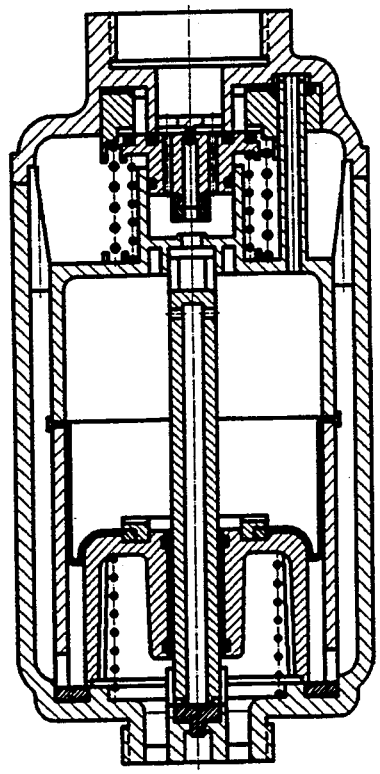

The mode of operation of the flow control valve will be described by reference to FIGS. 12 to 21. FIGS. 12 to 14 show the case where there is no flow-through (Q=0) or there is a leak with very little flow-through on the outlet side A of the valve. FIG. 12 shows the parts of the valve in the rest position when there is no flow-through. However, if a leak occurs, water flows unhampered through the bores 374 according to FIG. 22 into the chamber above the piston 4. In the rest position, the piston 4 blocks the opening 405, moves downward, takes the guide tube 402 along so that it comes to rest on the tang 404.

If the leak continues, the piston 4 continues to move downward, as shown by FIG. 13, and finally seals the outlet opening A, as shown in FIG. 14. If the leak stops, for example by correct closing of a spigot, the water above the piston 4 can flow back in the opposite direction.

Figure 15:
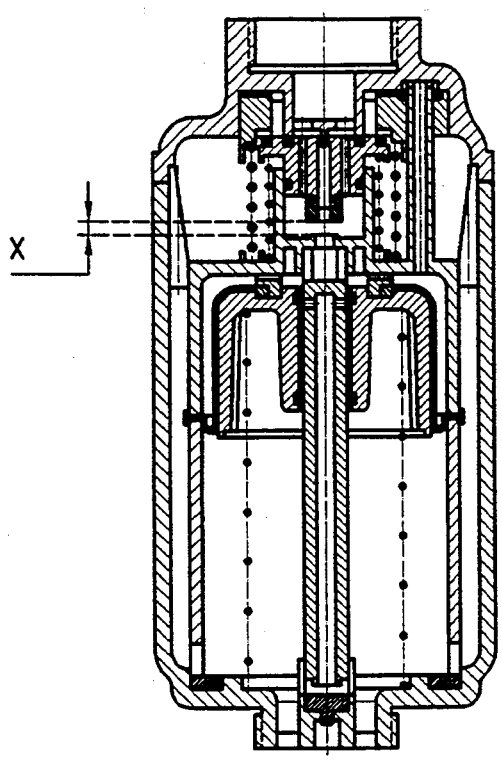
Figure 16:
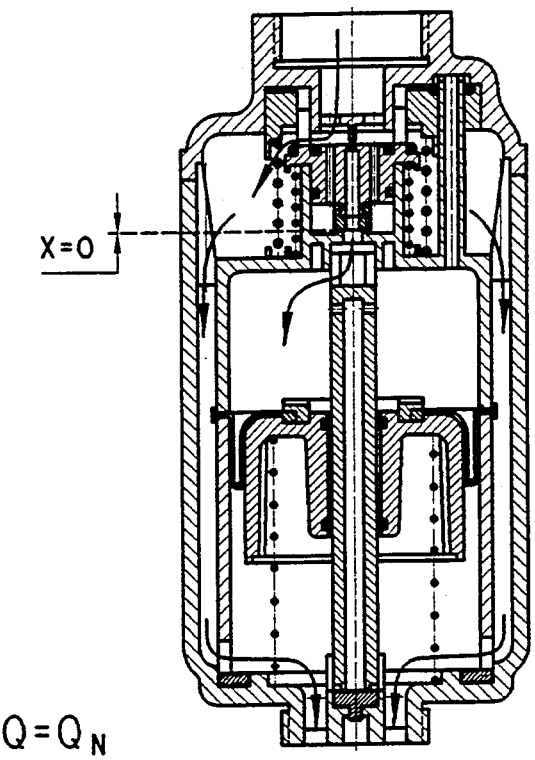
Figure 17:
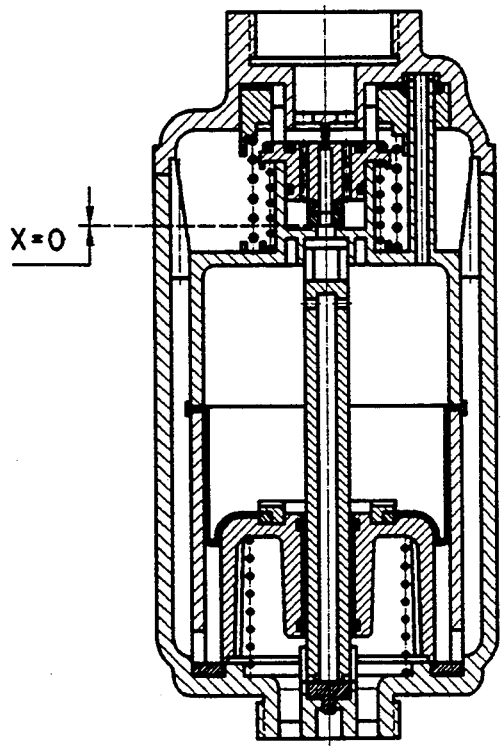
Figure 18:
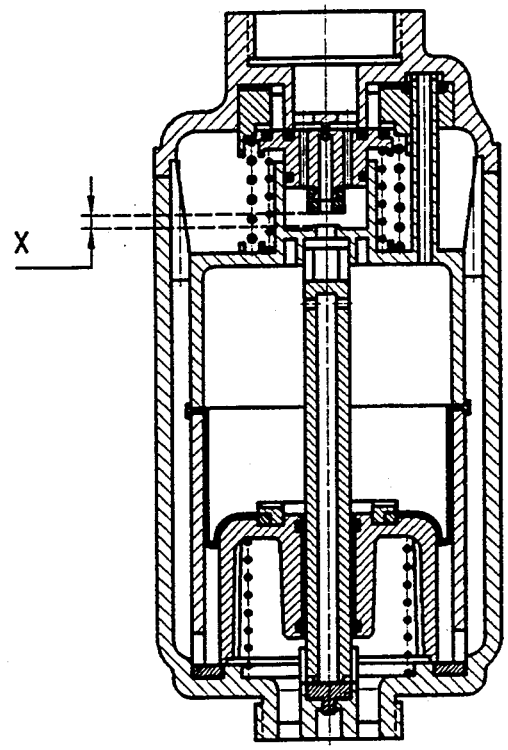

FIGS. 15 to 18 show the mode of operation of the flow control valve with the normal flow-through amount (Q=$Q_N$), but where the length of flow-through is limited to a defined length of time. FIG. 15 again shows the rest position without flow-through. FIG. 16 shows the position during normal flow-through, where the first control element 3 is moved downward over the distance X. The water now flows around the insert piece in the direction of the arrows shown in FIG. 16. But, because the downward movement of the control element has also uncovered the capillary bore 371, the chamber above the piston 4 also slowly fills, so that the latter slowly moves downward as FIG. 16 shows. FIG. 17 shows the final position in which the piston 4 blocks further flow-through.

Now, if the flow-through is blocked on the outlet side by the closing of spigots or valves, equal pressure appears in the valve body, the control element 3 returns into its initial position and the chamber above the piston can be emptied as previously described and the valve is again ready to operate.

Figure 19:
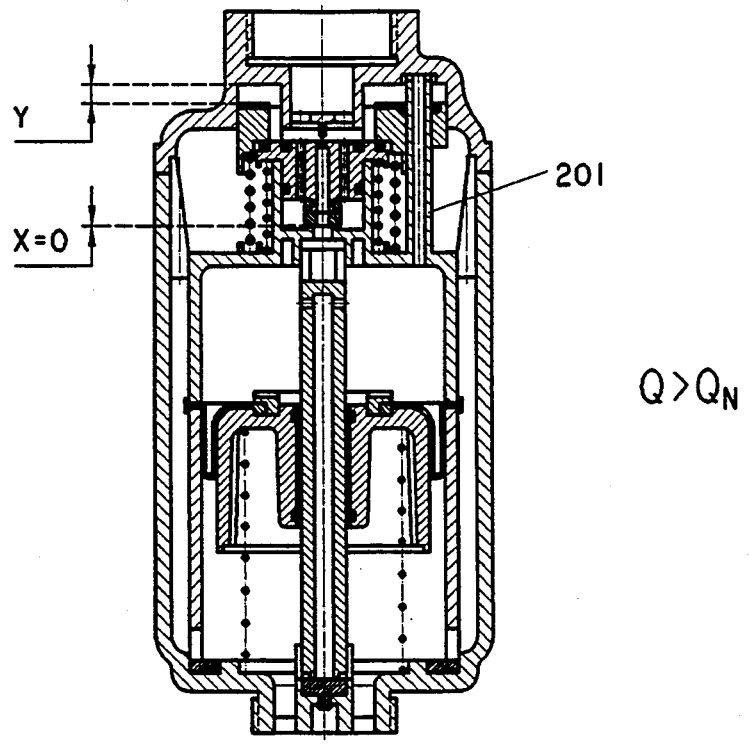
Figure 20:
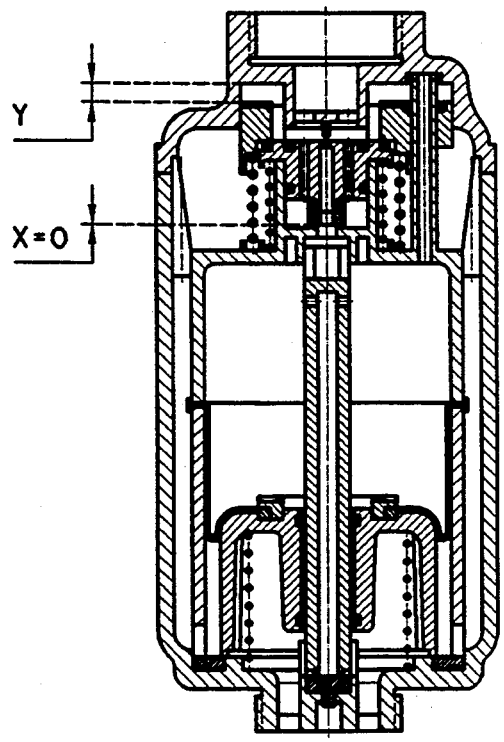
Figure 21:
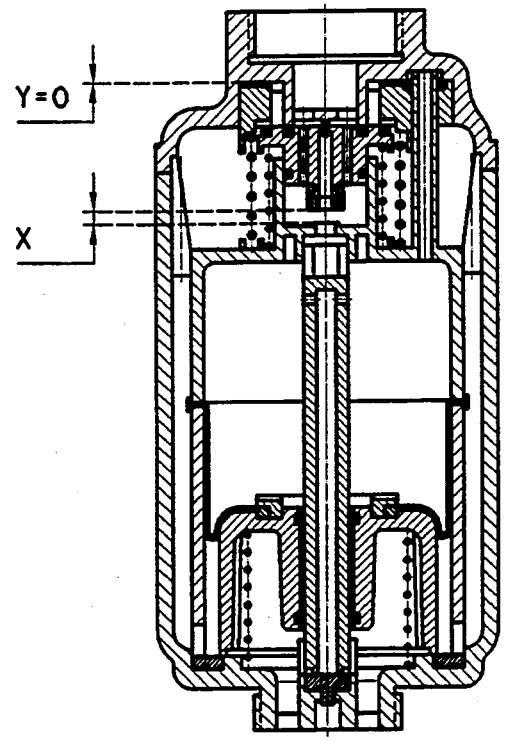

FIGS. 19 to 21 show the effect of the flow control valve when a pipe bursts or the normal flow-through amount for which the valve is designed is exceeded in some other way. The pressure difference between the pressure at the inlet side E and the pressure in the interior of the valve then becomes so great that not only the first control element 3 is lowered by the distance X, as during the normal amount of flow-through, but the second control element 5 is displaced downward by the distance Y until it comes to rest on the first control element 3. Further flow-through is then blocked, with the exception of the flow through the capillary bore 371, and the piston 4 moves downward. The upper inlet opening of the tube 201 is also uncovered by the downward movement of the second control element 5, so that now the chamber above the piston 4 moves downward much faster than with the flow through the capillary bore alone. Therefore the piston 4 quickly reaches the key position in accordance with FIG. 20. As long as the defect such as burst pipe is not repaired, the piston 4 remains in this key position because there is no counter-pressure on the outlet side. Only the inlet pressure is achieved in the valve itself, but there is no longer a pressure difference. Accordingly, the control elements 3 and 5 can return into their rest position, as shown in FIG. 21.

The last-described valve in accordance with FIGS. 12 to 21 has the advantage over the previously described valve, that there is no longer danger that the capillary bore become clogged, because the pin 372 enters the bore 371 each time the first control member 3 returns into its rest position. A further advantage consists in that the piston 4 can return more rapidly into its initial position. The closing time, during which the piston 4 reaches the position in accordance with FIG. 18 from the initial position in accordance with FIG. 15, is calculated to be longer than the time required in normal operation, for example while filling a washing machine. This means that during normal, trouble-free operation flow-through is already blocked when the piston 4 is in the position in accordance with FIG. 16. If flow-through is blocked, the control member 3 and the guide tube 402 return into their initial position and the water above the piston 4 can escape quickly through the bores 374 FIG. 22.

I claim:

1. In a flow control valve having a housing (1) in which an insert (2) around all sides of which a fluid can flow is disposed and which has a guide cylinder (21) on an inlet side, the improvement comprising: a shaft (32) of a first spring-loaded control element (3) is guided and axially displaceable in said guide cylinder (21), said first control element (3) having a valve disk (31) with a collar (33), said collar (33) having at least one lateral bore (34), said collar (33) enclosed by a second control element (5) forming a spring-loaded control sleeve which is guided and axially displaceable in said housing (1), and during zero flow-through a rim of said valve disk (31) resting against a control sleeve bottom of said second control element (5) thereby blocking said at least one lateral bore (34) in said collar (33) of said first control element (3).

2. In a flow control valve in accordance with claim 1, wherein said insert (2) has a main cylinder (22) adjoining said guide cylinder (21) at an outlet side and has a guided spring-loaded piston (4, 41), said first control element (3) has a central bore (32') extending through said disk (31) and said shaft (32), and a sealing element (24) is centrally disposed in a cylinder bottom of said guide cylinder (21) such that said sealing element (24) blocks said central bore (32') when said first control element (3) is fully opened.

3. In a flow control valve in accordance with claim 2, wherein a lower area of said shaft (32) tapers and has a lateral capillary bore (37) communicating between said guide cylinder (21) and said main cylinder (22), even when said central bore (32') is blocked by said sealing element (24) disposed in said cylinder bottom of aid guide cylinder (21).

4. In a flow control valve in accordance with claim 2, wherein a length of said shaft (32) of said first control element (3) is of a dimension whereby a lower end of said shaft (32) sealingly rests on said sealing element (24) when an underside of said disk (31) rests on an upper rim of said guide cylinder (21).

5. (Amended) In a flow control valve in accordance with claim 2, wherein a length of said control element (5) is of a dimension whereby in a lower operational position it simultaneously rests sealingly in a housing bore and on said disk (31) of said first control element (3) with a plurality of O-rings (35 and 53).

6. In a flow control valve in accordance with claim 1, wherein said insert (2) has a main cylinder (22) adjoining said guide cylinder (21) on an outlet side and has a spring-loaded piston (4, 41) therein guided, said first control element (3) has a central bore (32') extending through said disk (31) and said shaft (32), said guide cylinder (21) has a centrally disposed bore (231) a cylinder bottom of said guide cylinder (21) which is sealingly adjoined by said central bore (32') when said first control element (3) is fully opened, and at a top of said disk (31) said central bore (32') transitions into a capillary bore (371) into which a pin (372) fixedly disposed in an inlet opening (E) extends when said first control element (3) is in said rest position.

7. In a flow control valve in accordance with claim 6, wherein said piston (4) is sealed against a cylinder wall (22) with an unwinding diaphragm (401) and is routed through a guide tube (402) extending through a center area of said piston (4) and closed at said top, and said guide tube (402) is axially displaceable and has a bore (405) in an upper area.

8. In a flow control valve in accordance with claim 6, wherein said cylinder wall (22) is connected with a tube (201) leading to said inlet side, at a connection with said inlet side said tube (201) being only exposed when said second control element (5) leaves said rest position.

* * * * *